United States Patent Office 3,409,395
Patented Nov. 5, 1968

3,409,395
METHOD OF GROWING ALPHA-ALUMINA AND BETA-SILICON CARBIDE WHISKERS
James J. Shyne, Caldwell, and John V. Milewski, Saddle Brook, N.J., assignors to General Technologies Corporation, Reston, Va., a corporation of Delaware
No Drawing. Filed Apr. 5, 1965, Ser. No. 445,763
1 Claim. (Cl. 23—142)

---

ABSTRACT OF THE DISCLOSURE

A method of preparing alpha-alumina whiskers and beta-silicon carbide whiskers simultaneously in different growth areas by reacting a hydrocarbon gas containing 500 to 40,000 p.p.m. water with an alumina-silica receptacle containing a charge of aluminum metal.

---

This invention relates to single crystals, and more particularly, to a method of growing single crystal alpha-alumina whiskers in an improved manner.

Single crystal fibers of metals and metallic compounds are usually referred to in the art as "whiskers," such a crystalline form possesses unusually high strengths as compared to the bulk material. This property enables whiskers to serve as a reinforcement material for structural elements. Whiskers of metallic oxides, nitrides and carbides are particularly useful for this purpose because of their high temperature oxidative stability. Alpha-alumina, aluminum nitride, and silicon carbide whiskers are the preferred materials. Alpha-alumina is considered optimum in many applications. Generally alpha-alumina is prepared by a vapor phase oxidation of aluminum particles in a hydrogen atmosphere.

For example, in a copending patent application of the applicants herein, Serial No. 373,982, filed June 10, 1964 and now abandoned, there is described a method of growing alumina whiskers, in high yield. In this process hydrogen gas containing a predetermined concentration of water is passed over molten aluminum in a ceramic receptacle of predetermined composition at a selected rate in successive stages. At the conclusion of the run, a portion of the aluminum charge is oxidized to alpha-alumina whiskers, which are deposited on the sides of the receptacle. Commercial utilization of whisker materials, however, has been slow because of the high cost of the process for preparing such materials.

Accordingly, it is an object of the present invention to provide an improved method of preparing whiskers in high yield and at low cost.

A more specific object of the invention is to provide such a method wherein an atmosphere of a hydrocarbon gas is employed in the reaction tube.

Still another object is to provide a method for simultaneously preparing different whisker materials during the same run.

Among the other objects of the invention is to provide a method of making a whisker product which is stable and of a high degree of crystalline perfection.

These and other objects will be made apparent from the following more particular description of the invention.

In accordance with the foregoing objects of the invention, there is provided herein an improved method of growing whiskers in high yield and in a high degree of crystalline perfection. The feature of the invention is the use of a gas atmosphere in the growth area which is substantially composed of a hydrocarbon. In a preferred embodiment of the invention, the whisker material is alpha-alumina and the hydrocarbon gas is natural gas.

As a feature of the invention, there is produced simultaneously more than one whisker material. For example, during the preparation of alpha-alumina, a high yield of silicon carbide is produced. As another feature of the invention, the amount, quality and dimensions of the whisker product is predetermined by the reaction temperature.

The invention now will be illustrated with particular reference to the formation of alpha-alumina whiskers, although the novel features of the invention may be used to make other whisker materials as well.

The process of forming alpha-alumina whiskers herein starts with the general method of the prior art and then departs therefrom in the manner described. Accordingly, an aluminum charge of predetermined particle size is loaded into a refractory receptacle having a prescribed composition and heated in a furnace maintained at very high temperatures. The initial heating period, known as the "pre-growth" stage, does not involve the growth of any whiskers; rather it is a period during which intimate contact is achieved between the aluminum charge and the receptacle. Preferably a protective gas is maintained over the charge during this stage to prevent the formation of a heavy oxide skin on the aluminum. Usually dry inert gases, such as nitrogen, hydrogen, argon and the like are used.

At the end of this stage a burst of vapor issues above the charge area which signals the commencement of the first "growth stage." At this point, a hydrocarbon gas, such as natural gas, containing a small amount of water is passed over the charge at a predetermined flow rate. Near the end of the run, otherwise referred to as the "final growth" stage, the water concentration in the gas is increased and the flow rate is decreased to provide an optimum yield of whisker product.

The composition of the refractory receptacle for the aluminum charge is important in the process. Preferably it is made by firing an intimate mixture of alumina, fine metallic aluminum particles, and at least one other metallic oxide, usually silica. The aluminum particles are present in an amount comprising between about 1–20% by weight of the receptacle. Generally, the finer the particle size of the aluminum, the less is required. At a particle size of 200 mesh, for example, 2.5–7.5% aluminum by weight is used. Other metallic oxides, such as iron oxide, titania, chromium oxide, zirconium oxide or cobalt oxide, may be included in the receptacle composition. Preferably the receptacle is prepared by firing the constituents in air at between about 2000°–2500° F., and optimally at 2200° F.

During the pre-growth stage, the protective gas is kept as dry as possible, suitably no higher than 50 p.p.m. of water, and preferably not exceeding 20 p.p.m. During the growth and final growth stages, water is added incrementally to the hydrocarbon gas stream, usually in the order of 500 p.p.m. at the beginning of the growth stage, and about 3,000 p.p.m. near the end of the final growth. However, up to 40,000 p.p.m. of water may be used.

The flow rate of the hydrocarbon gas preferably is maintained between about 0.0002 to 0.0007 cu. ft./sec. at a reaction temperature between about 2400° to 3000° F. A typical run lasts about an hour.

While natural gas is a preferred hydrocarbon gas because of its low cost, other hydrocarbons which function in a similar manner may be used as well.

The following specific examples will more particularly illustrate the invention. It will be understood that the flow rates given are relative to the dimensions of the tube used in the examples.

EXAMPLE 1

A boat for the aluminum charge is prepared by mixing 3 lbs. 2 oz. of ceramic powder sold by Norton and Co. by designation "1162" having the following composition: 75 parts alumina, 15 parts silica, 5 parts titania, 2.5 parts ferric oxide and 2.5 parts other metallic oxides (by weight), and 0.16 lb. of 200 mesh aluminum powder (5% by weight of aluminum) in a slip-casting mold. The green mold then is fired in air at 2200° F. for about a half-hour. The boat has the dimensions 5 x 17 x 2 inches. A charge of 2 lbs. 8 oz. of aluminum pellets is spread evenly on the bottom of the boat. The boat is loosely fitted with a cover of the same composition as that of the boat except that the powdered aluminum is omitted. The cover for the boat is prepared by mixing the constituents, shaping in a slip-casting mold, and firing the green ceramic in air at 2200° F. for about a half-hour. The charged boat then is inserted into a quartz tube having a cross-sectional area of about 20 sq. inches. The effective open area of the tube is about 12 square inches. The tube is placed in a furnace set at 2550° F.

The aluminum charge then is wetted into the boat material in a protective stream of essentially dry hydrogen gas (less than 20 p.p.m. water) for about 10 minutes. Then the hydrogen gas is shut off and the wet hydrocarbon gas is admitted. Growth of whiskers then begins. The hydrocarbon gas contains mostly methane (93.6%) and ethane (3.71%), plus smaller amounts of other higher hydrocarbons. The water concentration of the gas is about 500 p.p.m. The flow rate is 0.0007 cu. ft./sec. After 15 minutes the water content of the gas is increased to 3000 p.p.m. The growth period lasts 45 minutes. Alpha-alumina whiskers are obtained principally on the underside of the cover in the form of an enmeshed mat. Concurrently a quantity of silicon carbide whiskers is produced above the charge and below the mat. The mat product is about 1/16" thick, and contains whiskers having a diameter of between about 1–3 microns. The density of the mat is about 0.01 g./c.c. and the yield is 1.0 g. About 5 g. of silicon carbide (beta) whiskers of 1–5 microns diameter is produced. Some beta silicon carbide (about 0.5 g.) also is found in cooler portions of the tube.

EXAMPLE 2

The flow rate of methane gas during the run described in Example 1 is decreased to 0.00025 cu. ft./sec., and the furnace temperature is increased to 2700° F. The other process conditions of Example 1 are kept the same. Thereby the yield and diameter of the whiskers produced is increased. The yield of alpha-alumina is 2.8 g. and the diameter of the whiskers is about 1–10 microns. The density is about 0.02 g./c.c. About 15 g. of beta silicon carbide whiskers of 1–5 microns diameter is obtained too.

EXAMPLE 3

The experimental conditions of Example 2 are repeated with the temperature being lowered to 2600° F. The yield is 2.1 grams of an alpha-alumina mat of fine diameter whiskers having a diameter of 1–6 microns with a density of 0.02 g./cc.; and 21.6 grams of beta silicon carbide whiskers.

While we have described our invention with particular reference to certain embodiments thereof, it will be understood that changes and modifications may be made which are within the skill of the art and the spirit of the invention.

What is claimed is:

1. A method of making alpha-alumina whiskers which is capable of producing silicon carbide whiskers simultaneously, which comprises:
  (a) providing a reaction chamber in which is placed a boat comprising alumina and silica, and charging said boat with aluminum metal,
  (b) heating said chamber to between 2400°–3000° F.,
  (c) passing natural hydrocarbon gas or methane containing water in an amount of at least 500 p.p.m. and no higher than 40,000 p.p.m. over said charge, thereby to grow alpha-alumina whiskers from said charge, a quantity of silicon carbide whiskers being produced simultaneously in the vicinity of said alpha-alumina whiskers.

References Cited

UNITED STATES PATENTS

| | | | |
|---|---|---|---|
| 3,011,870 | 12/1961 | Webb et al. | 23—142 |
| 3,077,380 | 2/1963 | Wainer et al. | 23—142 |
| 3,240,560 | 3/1966 | Spear | 23—142 |
| 3,306,705 | 2/1967 | Leineweber et al. | 23—208 |
| 3,341,285 | 9/1967 | Kelsey | 23—142 |
| 3,012,856 | 12/1961 | Berry | 23—191 |

FOREIGN PATENTS

| | | |
|---|---|---|
| 608,032 | 11/1960 | Canada. |

OSCAR R. VERTIZ, *Primary Examiner.*

G. T. OZAKI, *Assistant Examiner.*